US008380139B2

(12) United States Patent
Feng

(10) Patent No.: US 8,380,139 B2
(45) Date of Patent: Feb. 19, 2013

(54) RADIO FREQUENCY INTERFACE SWITCHING DEVICE

(75) Inventor: Jian-Yan Feng, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 705 days.

(21) Appl. No.: 12/616,314

(22) Filed: Nov. 11, 2009

(65) Prior Publication Data

US 2010/0248652 A1 Sep. 30, 2010

(30) Foreign Application Priority Data

Mar. 24, 2009 (CN) .......................... 2009 1 0301077

(51) Int. Cl.
*H04B 1/44* (2006.01)
*H04B 1/46* (2006.01)

(52) U.S. Cl. ................ 455/78; 455/79; 455/80; 455/81; 455/82; 455/83

(58) Field of Classification Search .................... 455/78, 455/79, 80, 81, 82, 83
See application file for complete search history.

(56) References Cited

U.S. PATENT DOCUMENTS

| | | | | |
|---|---|---|---|---|
| 4,726,054 | A * | 2/1988 | Molnar | 370/276 |
| 2002/0140040 | A1* | 10/2002 | Hidaka et al. | 257/393 |
| 2003/0090337 | A1* | 5/2003 | Culliton et al. | 333/125 |
| 2004/0205821 | A1* | 10/2004 | Yamada et al. | 725/80 |
| 2005/0088253 | A1* | 4/2005 | Yoon et al. | 333/101 |
| 2009/0015073 | A1* | 1/2009 | Lloyd | 307/112 |
| 2009/0033435 | A1* | 2/2009 | Otani et al. | 333/103 |

FOREIGN PATENT DOCUMENTS

CN 1133514 A 10/1996

* cited by examiner

*Primary Examiner* — Wen Huang
(74) *Attorney, Agent, or Firm* — Altis Law Group, Inc.

(57) ABSTRACT

An exemplary radio frequency interface switching device includes a plurality of signal interfaces, a plurality of switches electrically connected to the signal interfaces, and a switch unit electrically connected to the switches. The signal interfaces are electrically connected with each other by operating different combinations of the switches and the switch unit to receive/send corresponding signals.

4 Claims, 4 Drawing Sheets

RADIO FREQUENCY INTERFACE SWITCHING DEVICE

BACKGROUND

1. Technical Field

The disclosure generally relates to switching devices, more particularly, to a radio frequency interface switching device.

2. Description of the Related Art

In use, most electronic devices, such as televisions, computers, etc, usually have a plurality of radio frequency ports for transmitting/receiving corresponding radio frequency signals. However, in use, because the radio frequency ports may have different specifications which are inconsistent with the signals, thus, it is necessary to use a radio frequency interface switching device to switch transmission path of the signal.

Referring to FIG. 4, a typical radio frequency signal switching device 1 often includes a first radio frequency port 2, a second radio frequency port 3, and a wire 4 electrically connected the first radio frequency port 2 with the second radio frequency port 3. However, the radio frequency signal switching device 1 has only one type of radio frequency port, thus, it is inconvenient to switch between varieties or different types of radio frequency signals.

Therefore, there is room for improvement within the art.

BRIEF DESCRIPTION OF THE DRAWINGS

Many aspects of a radio frequency interface switching device can be better understood with reference to the following drawings. The components in the drawings are not necessarily drawn to scale, the emphasis instead being placed upon clearly illustrating the principles of the exemplary radio frequency interface switching device. Moreover, in the drawings, like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
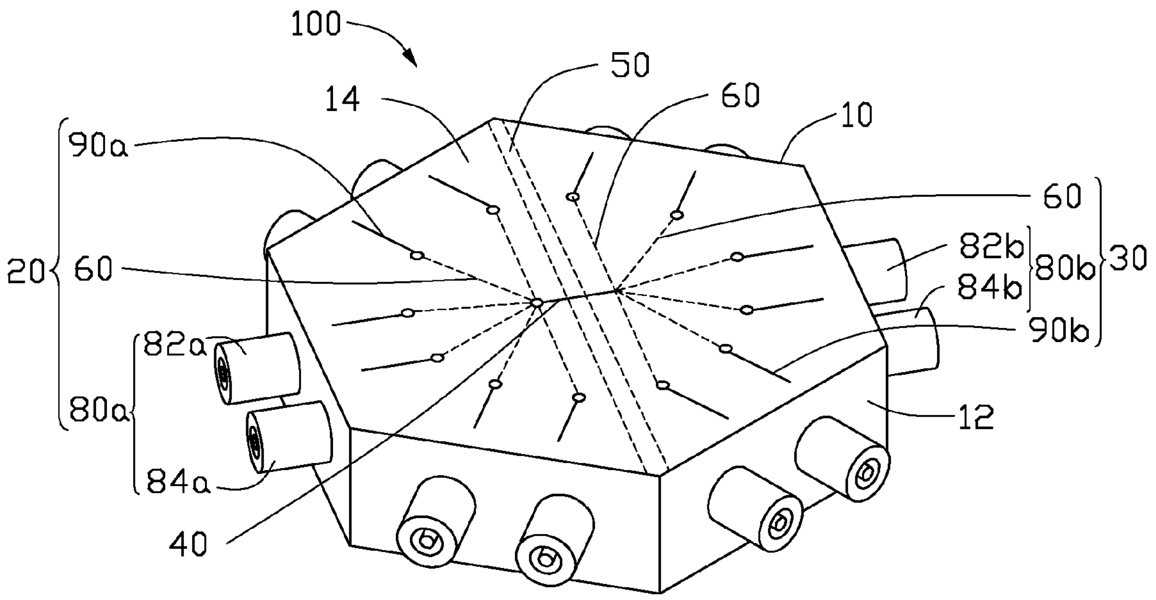
FIG. 1 is a perspective view of a radio frequency interface switching device, according to an exemplary embodiment.
Figure 2:
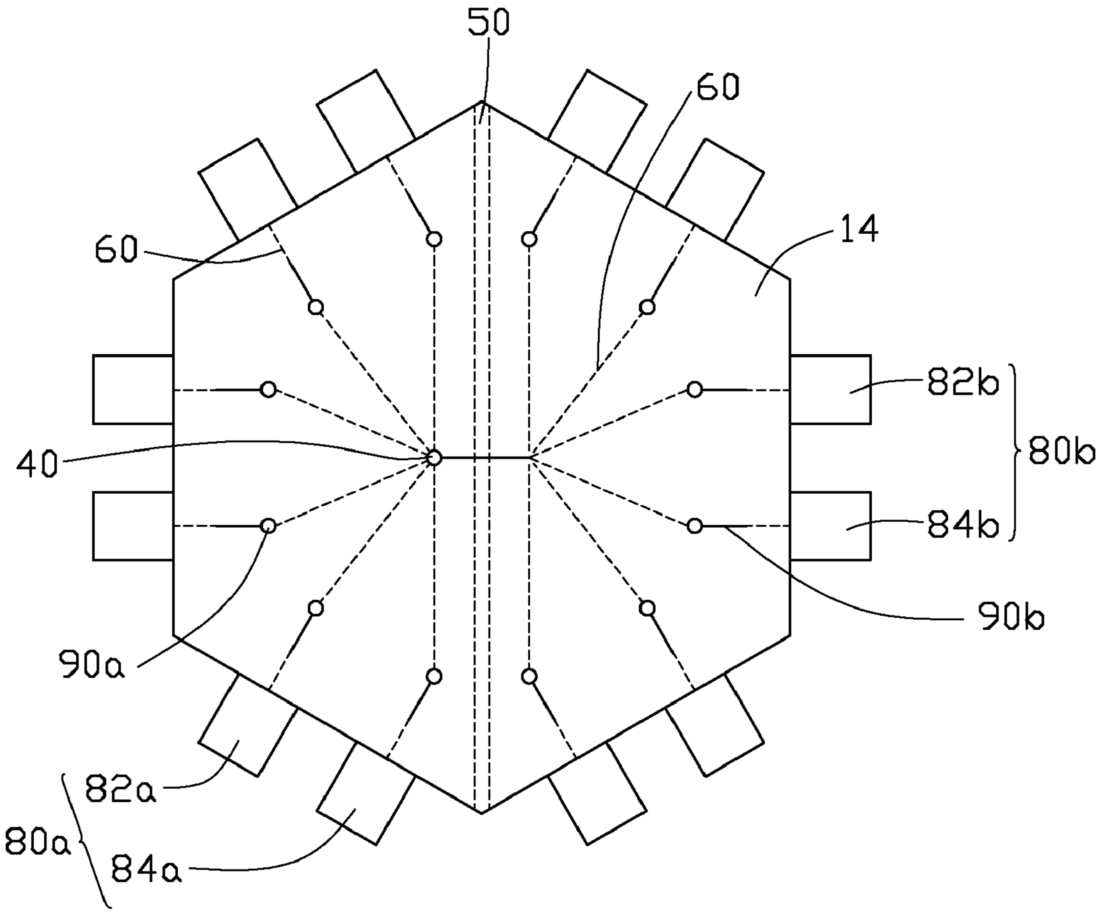
FIG. 2 is a top plan view of the radio frequency interface switching device shown in FIG. 1.
Figure 3:
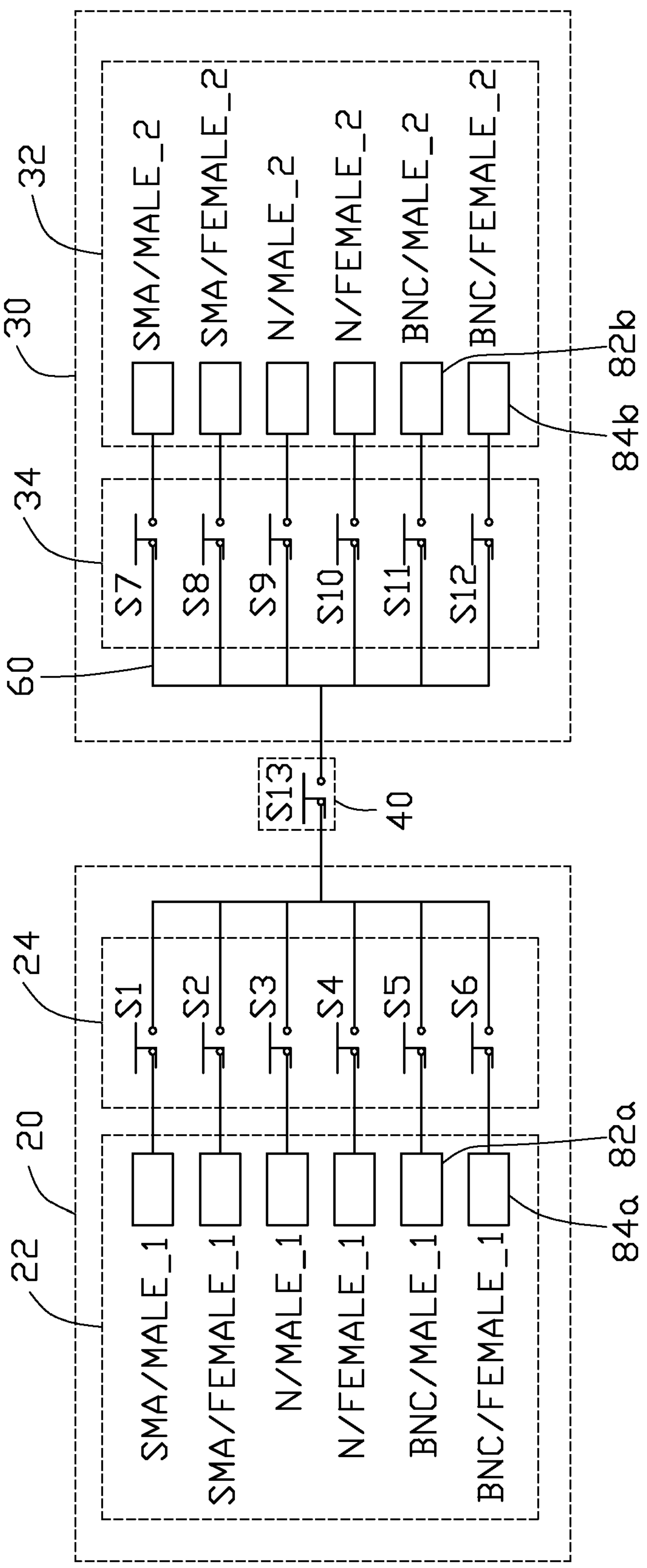
FIG. 3 is a circuit schematic view of the radio frequency interface switching device shown in FIG. 1.
Figure 4:
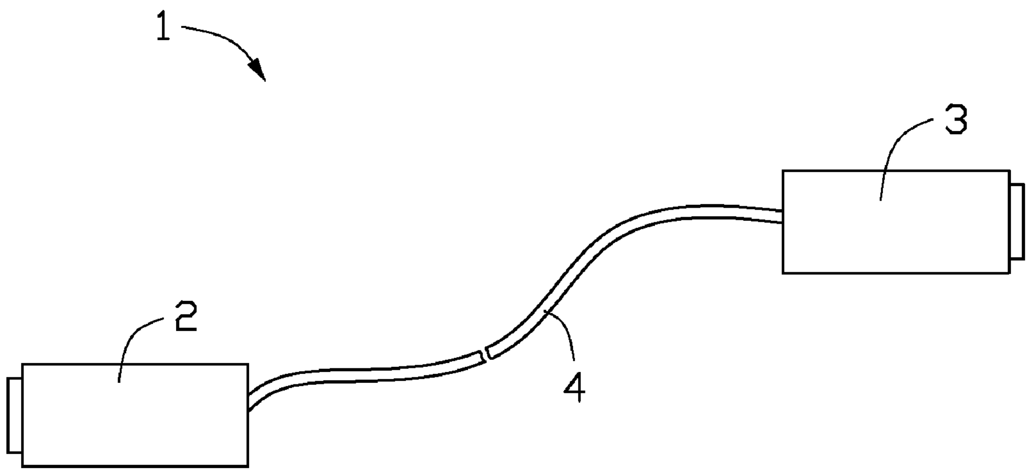
FIG. 4 (RELATED ART)
FIG. 4 is a schematic view of a typical radio frequency signal switching device.

FIGS. 1-3 show an exemplary embodiment of a radio frequency interface switching device 100 for transmitting different types of radio frequency signals. The radio frequency interface switching device 100 includes a housing 10, a first switching unit 20, a second switching unit 30, a switch unit 40, and a baffle 50 disposed between the first switching unit 20 and the second switching unit 30.

The housing 10 may have any shape, e.g., may be a regular square prism, regular hexagonal prism, etc. The housing 10 may then include a plurality of planar or curved side walls 12 and a planar or curved operating surface 14 attached to the side walls 12.

Referring to FIG. 3, the first switching unit 20 includes a first interface module 22 and a first switch module 24. The first interface module 22 includes a plurality of signal interfaces 80*a* mounted in the side walls 12 of the first switching unit 20 portion of the housing 10. The signal interfaces 80*a* can be any one type or combination of two and more than two types of Sub-Miniature-A interfaces, N interfaces, BNC interfaces. Each type of signal interface 80*a* as described above includes a male port 82*a* and a female port 84*a* to receive/send radio frequency signals. The male port 82*a* and the female port 84*a* can be mounted in the same side wall 12, and may be marked with an indicia (not shown) to facilitate identification and application.

The first switch module 24 includes a plurality of switches 90*a*, and each switch 90*a* can be existing toggle switch, single pole single throw (SPST), etc. The switches 90*a* are slidably disposed on the operating surface 14 to close or open any signal interface 80*a* of the first switching unit 20.

The number of the signal interfaces 80*a* equals the number of switches 90*a*, and each signal interface 80*a* is electrically connected to a corresponding switch 90*a* by a transmission line 60. The resistance of the transmission line 60 is set to about 50 ohms for reducing transmission loss of the radio frequency signals.

The second switching unit 30 includes a second interface module 32 and a second switch module 34. The structures of the second interface module 32 and the second switch module 34 are generally identical with the structures of the first interface module 22 and the second switch module 24. The second interface module 32 includes a plurality of different signal interfaces 80*b* mounted in the side walls 12 of the second switching unit 30 portion of housing 10, as described above. The second switch module 34 includes a plurality of switches 90*b* disposed on the operating surface 14 as described above. The first switching unit 20 and the second switching unit 30 typically have the same type and number of signal interfaces and switches. Each signal interface 80*b* of the second switching unit 30 is electrically connected to the corresponding switch 90*b* of the second switching unit 30 by the transmission line 60.

The switch unit 40 may be an existing toggle switch, SPST, etc., slidably disposed at the central portion of the operating surface 14. The switch unit 40 is configured between the first switch module 24 and the second switch module 34, each switch 90*a* of the first switch module 24 is electrically connected to one end of the switch unit 40 through its corresponding transmission line 60, and each switch 90*b* of the second switch module 34 is electrically connected to another end of the switch unit 40 through its corresponding transmission line 60. The first interface module 22 is electrically connected or disconnected to the second interface module 32 by closing or opening the switch unit 40.

When the switch unit 40 is opened, the first switching unit 20 is disconnected from the second switching unit 30, and the first switching unit 20 and the second switching unit 30 can work independently. Thus, when any two switches of either one of the first switch module 24 and the second switch module 34 are closed, the first switching unit 20 and/or the second switching unit 30 can transmit the radio frequency signals between two same or different types of ports. The first switch module 24 and the second switch module 34 can be use at the same time, so that the radio frequency interface switching device 100 can simultaneously transmit two-way radio frequency signals.

When the switch unit 40 is closed, and any switch of either one of the first switch module 24 and the second switch module 34 is closed, the male port 82*a* or the female port 84*a* of the first switching unit 20 is electrically connected to the male port 82*b* or the female port 84*b* of the second switching unit 30 through the corresponding transmission lines 60. Thus one-way radio frequency signals can be transmitted between the same or different types of signal interfaces 80.

The baffle 50 is made from copper or other metal, and disposed between the first switch module 24 and the second switch module 34. The baffle 50 is configured for isolating the radio frequency signals between the first switching unit 20 and the second switching unit 30 to reduce interference and transmission loss.

Referring to FIGS. 2-3, in use, to conveniently explain the works principle of the radio frequency interface switching device 100, the switches 90*a* of the first switch module 24 are labeled as S1-S6 in turn, the switches 90*b* of the second switch module 34 are labeled as S7-S12 in turn, and the switch unit 40 is labeled as S13. The names of the signal interfaces 80*a* and 80*b* are marked as an exemplary embodiment, but not necessarily to limit the marked range of the signal interfaces 80*a* and 80*b*.

When the switch unit 40 is opened, and any two switches 90*a* of the first switch module 24 are closed, then the radio frequency signal can be transmitted between any two signal interfaces 80*a* of the first switching unit 20. For example, the male port 82*a* SMA/MALE_1 is electrically connected to the male port 82*a* N/MALE_1 when S13 is opened, and S1 and S3 are closed. Similarly, the radio frequency signal can also be transmitted between any two signal interfaces 80*b* of the second switch module 30 at the same time as signals are being transmitted between two signal interfaces 80*a* of the first switching unit 20. For example, the male port 82*b* SMA/MALE_2 is electrically connected to the female port 84*b* N/FEMALE_2 when S13 is still opened, and S7 and S8 are closed. Thus, since the baffle 50 can isolate the radio frequency signals between the first switching unit 20 and the second switching unit 30, the radio frequency interface switching device 100 can simultaneously and independently receive/send radio frequency signals without mutual interference.

When the switch unit 40 is closed, and any switch of either one of the first switch module 24 and the second switch module 34 is closed, then the radio frequency signal can be transmitted between any port of the first switching unit 20 and any port of the second switching unit 30 through the corresponding transmission lines 60. For example, the female port 84*a* N/FEMALE_1 is electrically connected to the female port 84*b* N/FEMALE_2 when S13, S4, and S10 are closed. The male port 82*a* N/MALE_1 is electrically connected to the female port 84*b* BNC/FEMALE_2 when S13, S3, and S12 are closed.

The signal interfaces 80*a* and 80*b* are mounted on the housing 10 of the radio frequency interface switching device 100 thereof; and the switches 90*a* of the first switch module 24, the switches 90*b* of the second switch module 34, and the switch unit 40 are selectively connected to the signal interfaces 80*a* and 80*b*. The radio frequency interface switching device 100 can switch between different types and varieties of signal interfaces by using different combinations of switches. Therefore, the radio frequency interface switching device 100 offers greater flexibility, is easy to use, and can transmit different types of radio frequency signals.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A radio frequency interface switching device, comprising:

a first switching unit comprising a first interface module that comprises a plurality of first signal interfaces and a first switch module that comprises a plurality of first switches corresponding to the first signal interfaces, each of the first signal interfaces electrically connected to a first end of each of the corresponding switches;

a second switching unit comprising a second interface module that comprises a plurality of second signal interfaces and a second switch module that comprises a plurality of second switches corresponding to the second signal interfaces, each of the second signal interfaces electrically connected to a first end of each of the corresponding switches; and a switch unit, a second end of each of the first switches electrically connected to a first end of the switch unit, a second end of each of the first switches electrically connected to a second end of the switch unit;

wherein when the switch unit is opened, the first switching module and the second switching module work independently, and any two of the first interfaces or any two of the second interfaces are electrically connected with each other to respectively transmit one-way radio frequency signal between the two first interfaces or between the two second interfaces by turning on two of the corresponding first switches or two of the corresponding second switches.

2. The radio frequency interface switching device as claimed in claim 1, wherein when the switch unit is closed, the first switching module and the second switching module work cooperatively, and one of the first interface is electrically connected to one of the second interface to transmit one-way frequency signal from the one of the first interface to the one of the second interface by turning on one of the first switches and one of the second switches.

3. The radio frequency interface switching device as claimed in claim 1, further comprising a baffle between the first switch module and the second switch module, the baffle being configured for reducing signal interference and transmission loss.

4. The radio frequency interface switching device as claimed in claim 1, wherein each switch is electrically connected to the switch unit by a corresponding transmission line.

* * * * *